United States Patent
Durst

[11] 3,876,059
[45] Apr. 8, 1975

[54] VERTICALLY SHIFTABLE CONVEYOR DEVICE

[75] Inventor: Walter Durst, Reinfeld, Germany

[73] Assignee: Orenstein & Koppel AG, Lubeck, Germany

[22] Filed: June 25, 1973

[21] Appl. No.: 373,036

[30] Foreign Application Priority Data
June 29, 1972 Germany.......................... 2231857

[52] U.S. Cl. ..................... 198/77; 198/126; 214/14
[51] Int. Cl. ........................................... B65g 37/00
[58] Field of Search ................ 198/77, 126; 214/14

[56] References Cited
UNITED STATES PATENTS

| | | | |
|---|---|---|---|
| 677,718 | 7/1901 | Titcomb | 214/14 |
| 760,479 | 5/1904 | Patterson | 198/77 |
| 1,525,950 | 2/1925 | Prescott | 198/77 X |

FOREIGN PATENTS OR APPLICATIONS

| | | | |
|---|---|---|---|
| 1,805,526 | 2/1970 | Germany | 198/126 |

Primary Examiner—Evon C. Blunk
Assistant Examiner—Douglas D. Watts
Attorney, Agent, or Firm—McGlew and Tuttle

[57] ABSTRACT

A conveyor device comprises a guide which adapted to be mounted on a support in either in a fixed position or as to be movable therealong and it defines a guideway for the vertical displaceable movement of a vertically elongated upright position of an endless conveyor support structure which also includes a horizontally extending section at its lower end. The conveyor support structure carries a plurality of guide pulleys or rollers with two arranged in spaced location on the horizontally extending portion and one carried at the upper end of the vertically extending portion. The guide is advantageously carried on a jib or boom which may be positioned adjacent a carrier such as ship and swung over the ship in order to orient the conveyor structure in this ship for unloading. For this purpose, the conveyor comprises an endless conveyor which has scoops or buckets which are guided over the rollers or pulleys of the conveyor support structure and over two additional rollers or pulleys which are arranged in a spaced relationship on a fixed portion of the guide structure on the supporting beam. The fixed pulleys are arranged so that they guide the endless conveyor in a downward direction over a receiving conveyor which is carried on the boom so that the material is dropped out of the buckets. The buckets pick up the material when they are guided by the rollers at the lower end of the conveyor support downwardly and around into the material to be picked up and then are moved upwardly to the fixed support rollers. The support structure may be shifted vertically in its guide to change the location of the lowermost reach of the conveyor so that the conveyor device may be immediately adjusted to the loading material height.

9 Claims, 3 Drawing Figures

3,876,059

VERTICALLY SHIFTABLE CONVEYOR DEVICE

BACKGROUND OF THE INVENTION

1. Field of the Invention

This invention relates in general, to conveying devices and, in particular to a new and useful conveyor device or unloader which includes a guideway for a conveyor support structure which permits movement of the support structure upwardly and downwardly in order to shift the lower reach of an endless conveyor which is guided by rollers carried by the support structure and by two fixed rollers arranged alongside the upper end of the support structure.

2. Description of the Prior Art

A conveying apparatus in the form of an unloader for unloading ship's holds is known which includes a mobile vertical conveyor portion of a conveyor of a type referred to as a bucket elevator, scoop conveyor or skip conveyor which includes a lower portion which is adapted to pivot about a horizontal axis which is located above the top of the compartment which is being unloaded. Some means are provided to shift the pivotal conveyor portion such as a hydraulic drive motor so that it may be pivoted upwardly from a supporting frame located above the top of the compartment. The support for the conveyor can include one or more pivotal tensioning pulleys which keep the conveying arrangement of the vertical conveyor tensioned in the upwardly pivoted position. In the lower position of the conveyor, the tensioning pulley can be situated at or approximately at the same height as the guide pulleys. The construction permits movement of the vertical conveyor, for example on a ship and permits the lower end of the vertical conveyor to be pivoted upwardly when the unloading device is shifted from one compartment to another. The known device requires the upward pivotal movement of the lower portion of the vertical conveyor and it requires a sufficient compartment hatch area in order that the device may be adequately arranged and operated and shifted from one hatch to the other. Consequently, such apparatus is not suitable for unloading narrow containers.

Another shipboard bulk conveying installation comprises a dredging device adapted to travel in the longitudinal direction of the ship on a movable frame which moves along a trackway which extends over the hatch. The apparatus includes a conveyor belt which moves along during the traveling movement of the device which is supported partly by a vertical conveyor support provided at its lower end with a dredging arrangement which is employed for taking up the bulk material. Another apparatus is provided for taking down the bulk material to be discharged. Both conveyors are arranged to be capable of being lifted and lowered on a support of the traveling frame and this support is pivotable about a vertical axis.

Transverse conveyors are provided which are capable of discharging or receiving the material to and from a belt conveyor which extends in the longitudinal direction of the ship and comprises an end conveyor adapted to pivot about a vertical axis and in the vertical planes. In this installation the bulk material is taken up by bucket wheels which discharge the bulk material onto conveyor belts which are arranged in the bucket wheels arms and which convey the material toward the supporting frame and discharge it to transverse belts by means of intermediate belts. The conveyor belt which extends along the hatch forms in the region of the frame a loop whose guide pulleys are mounted on this frame. The mast associated with this hold for the end conveyor comprises a substantially U-shaped recess at desk height. Two vertical conveyors and carry down apparatus are arranged opposite on the support of the mobile frame. The known apparatus has the disadvantage that the loading and unloading apparatus is relatively long in the longitudinal direction of the ship and this is a disadvantage because it is difficult to maintain the inclination of the conveyor below a tilting angle of 20° when unloading a ship. Consequently, the known apparatus cannot be used for unloading ships wherein the hold space is subdivided by partition walls which are situated relatively close together.

Cargo ships having bucket elevators are also known which have elevators which extend downwardly into the hold and are held by mobile frames which are movable in the longitudinal direction of the ship. The frames carry a bucket elevator guide frame which is also adapted to move transversely to the ship. The bucket elevator can also be rotated on the bucket elevator guide frame about a vertical axis. When a ship has a plurality of successive holds, apertures are provided in the separating walls between the holds. Adjustable and removable closure plates are also provided for these apertures.

The receiving end of the elevator is guided toward the material to be handled by means of a self-moved abutment device or a pushing device which slides on the floor and is connected to the elevator end or which is held fast on the iron floor by an electromagnet. Such a constructional arrangement has the disadvantage that the partition walls are provided with apertures which weaken the ship's structure.

An unloading apparatus for ships is also known which is not arranged on the ship but which is supported on a running gear unit which is adapted to travel on the quay or loading pier and in the longitudinal direction of the quay. The running gear unit for this purpose carries a vertical conveyor with an upper and lower guide drum. The lower end of the vertical conveyor is constructed as a pivotal arm which is capable of being adjusted by means of a rope system. A disadvantage of the entire installation is that the entire unloading apparatus with the vertical conveyor and the pivotal arm supporting it has to be lifted both at the beginning and at the end of unloading until the lower end thereof clears the hatch coaming. Only then can the unloading apparatus be moved on to the next hold.

SUMMARY OF THE INVENTION

In accordance with the invention, there is provided a conveyor device which includes a vertical conveyor which may be adjusted vertically by moving the smallest possible mass of a conveyor support structure and the structure is as simple as possible and provides a simple means for shifting the conveyor support structure while maintaining the same length of conveyor or endless chain at all times during the adjustment. The invention provides a conveyor support frame which includes a vertical extending portion which is guided in a vertical guideway for vertical adjustable movement. The support structure includes a guide roller at its upper end and two horizontally spaced guide rollers at its lower end and an endless chain is guided around these rollers and in addition, they are guided in respect to two stationary rollers. One of the stationary rollers which is adjacent the uppermost roller on the movable guide engages the endless conveyor on the side opposite to the upper roller on the guide. The construction is such that the generally L-shaped support structure may be moved upwardly and downwardly and the conveyor chain or conveyor belt is maintained in its guiding relationship in respect to the guide rollers. The supporting structure may be adjusted by means of a pulley or other suitable system which is connected thereto for the purpose of shifting it upwardly and downwardly in respect to a fixed support structure, for example in respect to a boom or a horizontally extending support structure. Any suitable means such as a hydraulic drive motor which is mounted on the stationary structure may be connected to the conveyor support member for the purpose of shifting it vertically on its guideway.

Accordingly, it is an object of the invention to provide a conveyor device which includes a conveyor support structure which is guided for vertical movement on a guide and which carries at least one upper conveyor guide roller and at least one lower conveyor guide roller with a conveyor of a type such as a chin or bucket conveyor guided over these rollers and over two stationarily arranged rotatable rollers pulleys arranged laterally of the uppermost roller and one of which guides the conveyor from the opposite side thereof from the upper roller of the support structure.

A further object of the invention is to provide a conveyor which is adapted to be carried on a support structure such as a movable boom which may be swung over a carrier to be unloaded and which carries a vertical guide for an upright portion of a generally L-shaped conveyor support structure having spaced rollers over which a conveyor is engaged, the support structure being movable vertically for shifting the lower reach of the conveyor to adjust the position thereof in respect to the load and a support structure including guide rollers located at fixed locations which guide the conveyor so as to unload the buckets thereof into a transversely extending carry off conveyor carried on the support structure and which are arranged to maintain the conveyor in engagement with the rollers of the movable support structure when it is moved.

A further object of the invention is to provide a conveyor device which is simple in design, rugged in construction and economical to manufacture.

For an understanding of the principles of the invention, reference is made to following description of a typical embodiment thereof as illustrated in the accompanying drawings.

GENERAL DESCRIPTION OF THE PREFERRED EMBODIMENT

Figure 1:
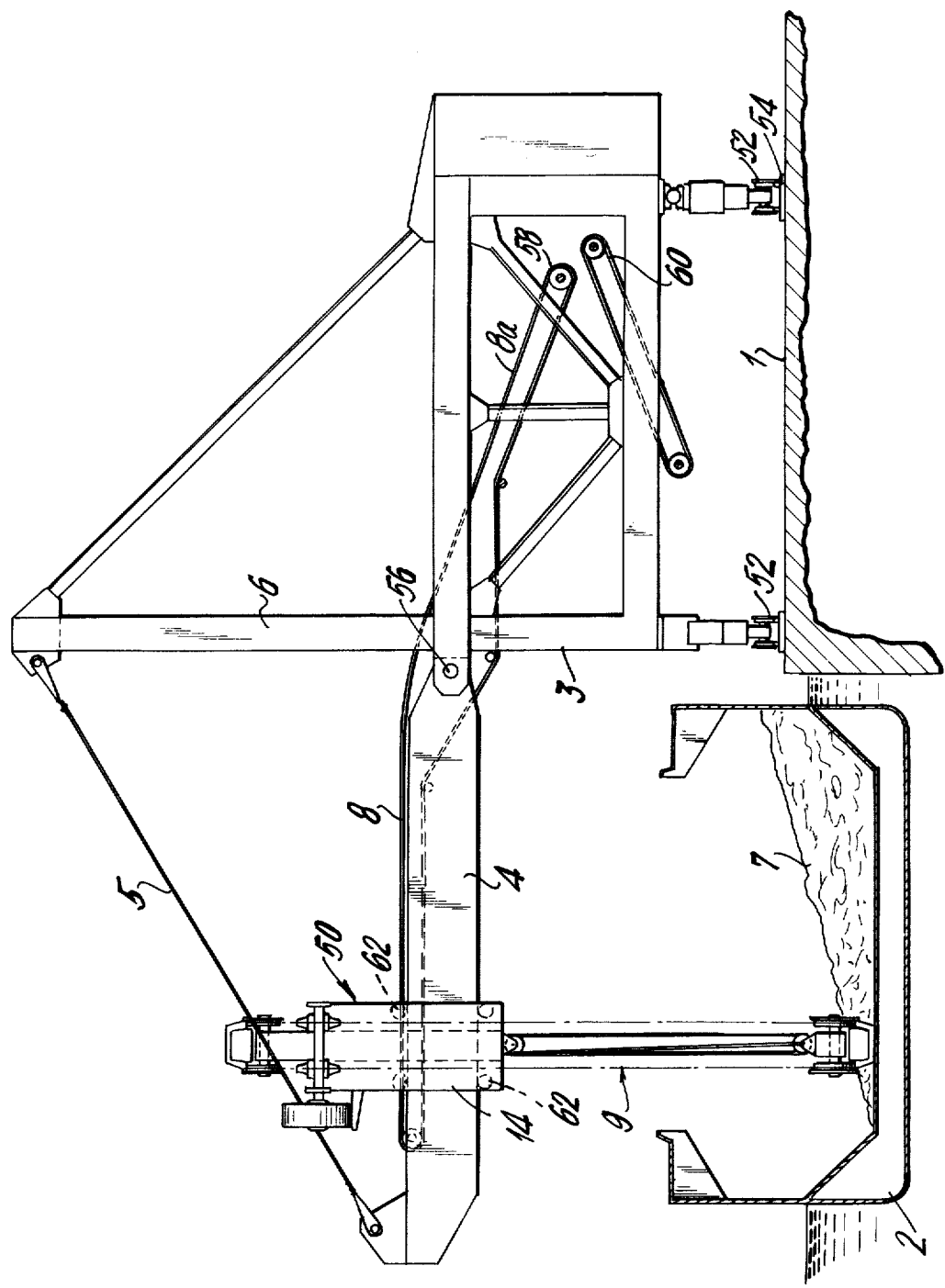
FIG. 1 is a side elevational view of a conveying apparatus constructed in accordance with the invention.

Referring to the drawings, in particular, the invention embodied therein comprises a conveyor or unloader generally designated 50 which is of a type which is adapted to be located on a pier or quay 1 along side which a ship 2 is docked. The hold of the ship is divided by transverse bulkheads into a plurality of individual hatches which extend in the longitudinal direction of the ship. The unloading device includes a support frame or carriage 3 having wheels 52 which permit it to be moved over a trackway 54 extending along the pier. A support or boom 4 has an inner end which is pivoted at 56 to the upper outboard end of the frame support structure 3. The frame support structure includes an upright mast portion 6 carrying a traction cable or tensioning rope 5 which engages the outer end of the support 4. The support structure 4 carries a carry off conveyor 8 which extends downwardly at the inner end thereof through the supporting structure 3 and terminates in a lower end 8a which extends over a pulley 58 which is located directly above a transfer conveyor 60 which discharges at its lower end onto a car or other device located on the quay 1.

In accordance with the invention, the conveyor 50 includes a guide 14 which is adapted to be carried upon the support 4 or which, as is indicated in the drawings, includes rollers 62 which permit it to be shifted along the support either inwardly or outwardly. A conveyor support structure generally designated 9 includes an L-shaped supporting frame 13 with an upright portion 20 which is guidable on rollers 14a, 14a, of the guide 14 for vertical displaceable movement. The support structure 13 also includes a horizontally extending portion 15 which is carried at the lower end of the vertical portion 20 and which carries two horizontally spaced rollers 16 and 17 at respective opposite ends thereof. The upright portion 20 carries an upper guide roller or pulley 21. The upper pulley or guide roller 21 and the additional pulley 16 and 17 are engaged by an endless conveyor or bucket chain 10 carrying individual buckets or scoops 10a arranged at regularly spaced intervals therealong.

In accordance with a feature of the invention, guide roller means are also carried in a fixed location for example at transversely spaced locations on the support 4 and they include a guide roller 11 and a reverse guide roller 12. The guide roller 12 is located transversely adjacent the upper guide roller 21 and it acts upon the conveyor 10 in the opposite sense from all of the other guide rollers so that the guide chain 10 is guided over the next adjacent rollers 11 and 21 and maintained in engagement with all of the rollers during the movement of the support member 13.

Conveyor support member moving means for moving the support structure 13 relative to the guide 14 includes a drive or pulley structure 22 which is carried by the support 4 and engages with the transversely extending horizontal portion 15 of the conveyor support structure 13.

In the embodiment of the invention shown the conveyor 10 includes two runs 18 and 19 which extend substantially parallel to each other.

Figure 2:
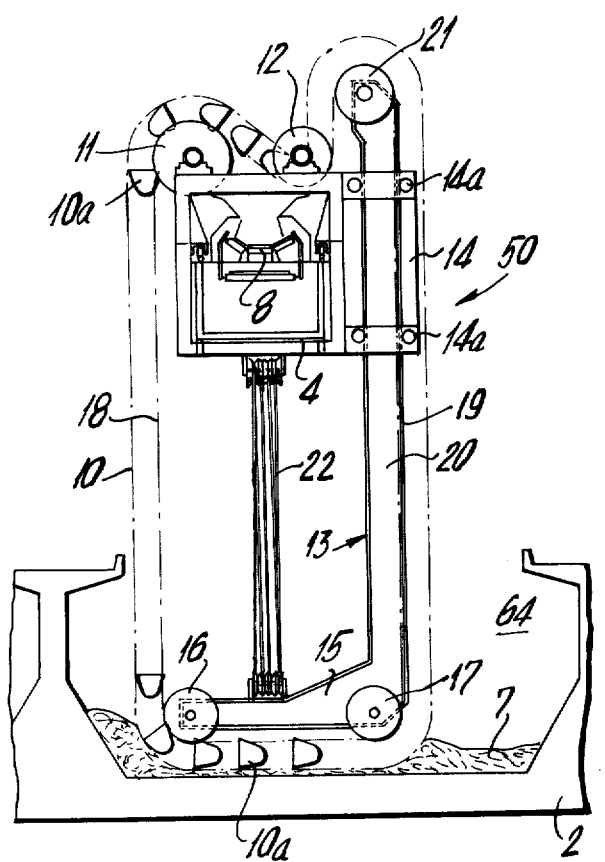
FIG. 2 is an end elevational view of the conveyor shown in FIG. 1.
Figure 3:
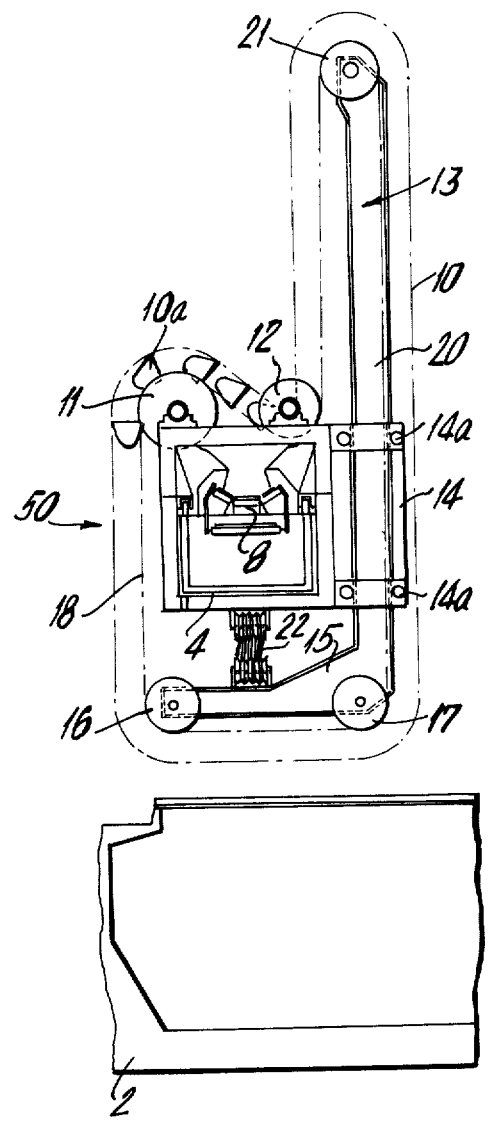
FIG. 3 is a view similar to FIG. 2 with the conveyor indicated in a raised position.

In the arrangement shown in FIG. 2 the lowermost reach of the conveyor which extends between the pulleys 16 and 17 is located downwardly into the hold 64 by an amount sufficient to cause the buckets 10a to work against the bulk material 7 which is to be removed and to lift it upwardly vertically and over the roller 11. Each bucket 10a which moves over the roller 11 dumps its load onto the carry off conveyor 8. Thereafter the conveyor 10 moves interiorly of the roller 12 and then exteriorly again of the upper roller 21. The drive means 22 may be actuated to raise the support structure 13 from the position shown in FIG. 2 to the position shown in FIG. 3 which is the uppermost position thereof. Thus, it can be readily seen that the conveyor 10 is maintained in association with its all drive and guiding pulleys during the movement of the support structure 13.

While a specific embodiment of the invention has been shown and described in detail to illustrate the application of the principles of the invention, it will be understood that the invention may be embodied otherwise without departing from such principles.

What is claimed is:

1. A bucket conveyor device, comprising guide means defining a vertical guideway, a conveyor roller support frame movable along said guideway and carrying an upper endless conveyor guide roller adjacent its upper end at at least one lower endless conveyor guide roller adjacent its lower end, conveyor guide roller means carried on said guide means, an endless conveyor guided over said upper and lower conveyor rollers and over said guide roller means, a plurality of open topped buckets connected to said endless conveyor adjacent their tops at spaced locations along the length of said conveyor, said guide roller means including a series of spaced rollers guiding said endless conveyor including a reverse guide roller adjacent the upper conveyor roller guiding said endless conveyor on a side thereof opposite to the side which is engaged by said upper conveyor roller and positioned so as to direct said endless conveyor with the associated buckets through a downward path to dump said buckets, a supporting structure adapted to be moved alongside a carrier loading space, a support arm having an end pivoted to said support structure, a mast carried by said support structure and having a traction member connected therefrom to said outer end of said support arm, said guide means including a guide member carried by said support arm and defining said vertical guideway.

2. A conveyor device, according to claim 1, wherein said conveyor roller support frame comprises a substantially L-shaped member including a vertically extending upright portion and a horizontally extending lower portion, said at least one endless conveyor guide roller adjacent to the lower end of said structure comprising two transversely spaced guide rollers carried by said horizontally extending lower portion of said support frame.

3. A conveyor, according to claim 1, including means conneected to said conveyor roller support frame to shift said support frame in said guide means.

4. A conveyor, according to claim 3, including a support structure carrying said guide means and a pulley block system extending between said support structure and the lower portion of said support frame for raising and lowering said support frame in said guide.

5. A conveyor device, according to claim 1, wherein said conveyor guide roller means comprises a supoort arm, a tubular guide member carried on said support arm and defining said vertical guideway.

6. A conveyor device, according to claim 5, wherein said guideway is movable along said support arm.

7. A device, according to claim 1, wherein the roller of said guide roller means which is adjacent to said upper conveyor guide roller comprises a reversing roller arranged below said upper guide roller and exteriorly of said endless conveyor.

8. A conveyor, according to claim 1, wherein said guide means includes a support structure, said guide roller means including a support guide roller mounted on said support structure spaced laterally from said reverse guide roller on the side thereof opposite to said upper conveyor guide roller, a material carry-off conveyor located below and between said support guide roller and said reverse guide roller in a location to receive material dumped by said buckets.

9. A bucket conveyor device according to claim 1, wherein said conveyor support comprises an L-shaped member having a vertical portion movable in said guideway and carrying said upper conveyor guide roller, and a horizontal portion carrying said lower roller, and at least one additional lower roller on said horizontal portion spaced laterally from said lower roller.

* * * * *